(12) United States Patent
Goldstein et al.

(10) Patent No.: US 11,710,096 B2
(45) Date of Patent: Jul. 25, 2023

(54) AUTOMATED INVENTORY MANAGEMENT FOR A PAINT COLOR CHIP DISPLAY ASSEMBLY

(71) Applicant: Behr Process Corporation, Santa Ana, CA (US)

(72) Inventors: Lindsey Goldstein, Aliso Viejo, CA (US); Mark Germain, Long Beach, CA (US)

(73) Assignee: Behr Process Corporation, Santa Ana, CA (US)

( * ) Notice: Subject to any disclaimer, the term of this patent is extended or adjusted under 35 U.S.C. 154(b) by 411 days.

(21) Appl. No.: 16/875,089

(22) Filed: May 15, 2020

(65) Prior Publication Data
US 2020/0380466 A1  Dec. 3, 2020

Related U.S. Application Data

(60) Provisional application No. 62/855,183, filed on May 31, 2019.

(51) Int. Cl.
*G06Q 10/0875* (2023.01)
*B65G 1/137* (2006.01)
*G01G 19/414* (2006.01)

(52) U.S. Cl.
CPC ....... *G06Q 10/0875* (2013.01); *B65G 1/1371* (2013.01); *B65G 1/1373* (2013.01); *G01G 19/414* (2013.01)

(58) Field of Classification Search
CPC .............. G06Q 10/087; G06Q 10/0875; A47F 2010/025; A47F 5/105; A47F 7/0042; A47F 7/146
See application file for complete search history.

(56) References Cited

U.S. PATENT DOCUMENTS

| 5,671,362 A * | 9/1997 | Cowe .................. G06Q 10/087 340/568.1 |
| 11,270,546 B1 * | 3/2022 | Mosman ................ G07F 11/40 |
| 2011/0266337 A1 * | 11/2011 | Reynolds ............... G06F 3/041 235/375 |
| 2012/0310570 A1 | 12/2012 | Pyne et al. |

* cited by examiner

*Primary Examiner* — Timothy R Waggoner
(74) *Attorney, Agent, or Firm* — Harness, Dickey & Pierce, P.L.C.

(57) ABSTRACT

A system includes a shelving unit, a sensor and a processor. The shelving unit includes a pocket. The sensor is associated with the pocket and is configured to obtain a parameter indicative of a weight of the pocket. The processor configured to execute instructions stored in a nontransitory computer-readable medium. The instructions include obtaining the parameter indicative of the weight of the pocket from the sensor, determining the weight of the pocket based on the parameter, comparing the weight of the pocket to a predetermined value, generating a paint chip order that includes a request in response to the weight of the pocket being below the predetermined value, and transmitting the paint chip order to a computing system.

6 Claims, 9 Drawing Sheets

AUTOMATED INVENTORY MANAGEMENT FOR A PAINT COLOR CHIP DISPLAY ASSEMBLY

CROSS-REFERENCE TO RELATED APPLICATION

This application claims the benefit of U.S. Provisional Application No. 62/855,183, filed on May 31, 2019. The entire disclosure of the above application is incorporated herein by reference.

FIELD

The present disclosure relates to automated inventory management systems and methods for a paint color chip display assembly, including systems and methods for ordering paint color chips for a display assembly.

BACKGROUND

This section provides background information related to the present disclosure and is not necessarily prior art.

Consumers may visit a retail store where paint colors are selected and/or purchased. The stores may include display assemblies that include paint color chips, which are often displayed at a point-of-sale to display various paint colors that are offered by the hardware store and are each associated with a particular paint color. The paint color chips of the display assemblies may run out of stock overtime. It is time consuming to manually determine the paint color chips that have run out of stock, and to order such paint color chips. The present disclosure provides systems and methods for determining which paint color chips have run out of stock. The present disclosure also provides systems and methods for ordering paint color chips for the display assemblies.

SUMMARY

This section provides a general summary of the disclosure, and is not a comprehensive disclosure of its full scope or all of its features.

In one form, the present disclosure provides a system that includes a shelving unit, a first sensor and a processor. The shelving unit includes a first pocket. The first sensor is associated with the first pocket and is configured to obtain a first parameter indicative of a weight of the first pocket. The processor is configured to execute instructions stored in a nontransitory computer-readable medium. The instructions includes obtaining the first parameter indicative of the weight of the first pocket from the first sensor, determining the weight of the first pocket based on the first parameter, comparing the weight of the first pocket to a predetermined value, generating a paint chip order that includes a first request in response to the weight of the first pocket being below the predetermined value, and transmitting the paint chip order to a computing system.

In some configurations of the system of the above paragraph, transmitting the paint chip order to the computing system causes the computing system to order a plurality of paint chips.

In some configurations of the system of any one or more of the above paragraphs, the shelving unit includes a second pocket. A second sensor is associated with the second pocket and is configured to obtain a second parameter indicative of a weight of the second pocket.

In some configurations of the system of any one or more of the above paragraphs, the instructions further include obtaining the second parameter indicative of the weight of the second pocket from the second sensor, determining the weight of the second pocket based on the second parameter, comparing the weight of the second pocket to the predetermined value, and adding a second request to the paint chip order in response to the weight of the second pocket being below the predetermined value.

In some configurations of the system of any one or more of the above paragraphs, the first request of the paint chip order causes the computing system to order a first set of paint chips that correspond to the first pocket and the second request of the paint chip order causes the computing system to order a second set of paint chips that correspond to the second pocket.

In some configurations of the system of any one or more of the above paragraphs, the first set of paint chips are of a first color and the second set paint chips are of a second color.

In some configurations of the system of any one or more of the above paragraphs, the shelving unit includes a set of retaining panels that define the first pocket. The first sensor is disposed on a bottom surface of one of the set of retaining panels.

In another form, the present disclosure provides a method that includes obtaining, using a first sensor, a first parameter indicative of a weight of a first pocket of a shelving unit; determining, using a processor, the weight of the first pocket from the first parameter; comparing, using the processor, the weight of the first pocket to a predetermined value; generating, using the processor, a paint chip order that includes a first request in response to the weight of the first pocket being below the predetermined value; and transmitting, using the processor, the paint chip order to a computing system.

In some configurations of the method of the above paragraph, the shelving unit includes a set of retaining panels that define the first pocket. The first sensor is disposed on a bottom surface of one of the set of retaining panels.

In some configurations of the method of any one or more of the above paragraphs, transmitting the paint chip order to the computing system causes the computing system to order a set of paint chips.

In some configurations of the method of any one or more of the above paragraphs, the method further includes obtaining, using a second sensor, a second parameter indicative of a weight of a second pocket of the shelving unit; determining, using the processor, the weight of the second pocket from the second parameter; comparing, using the processor, the weight of the second pocket to the predetermined value; and adding, using the processor, a second request to the paint chip order in response to the weight of the second pocket being below the predetermined value.

In some configurations of the method of any one or more of the above paragraphs, the first request of the paint chip order causes the computing system to order a first set of paint chips that correspond to the first pocket and the second request of the paint chip order causes the computing system to order a second set of paint chips that correspond to the second pocket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
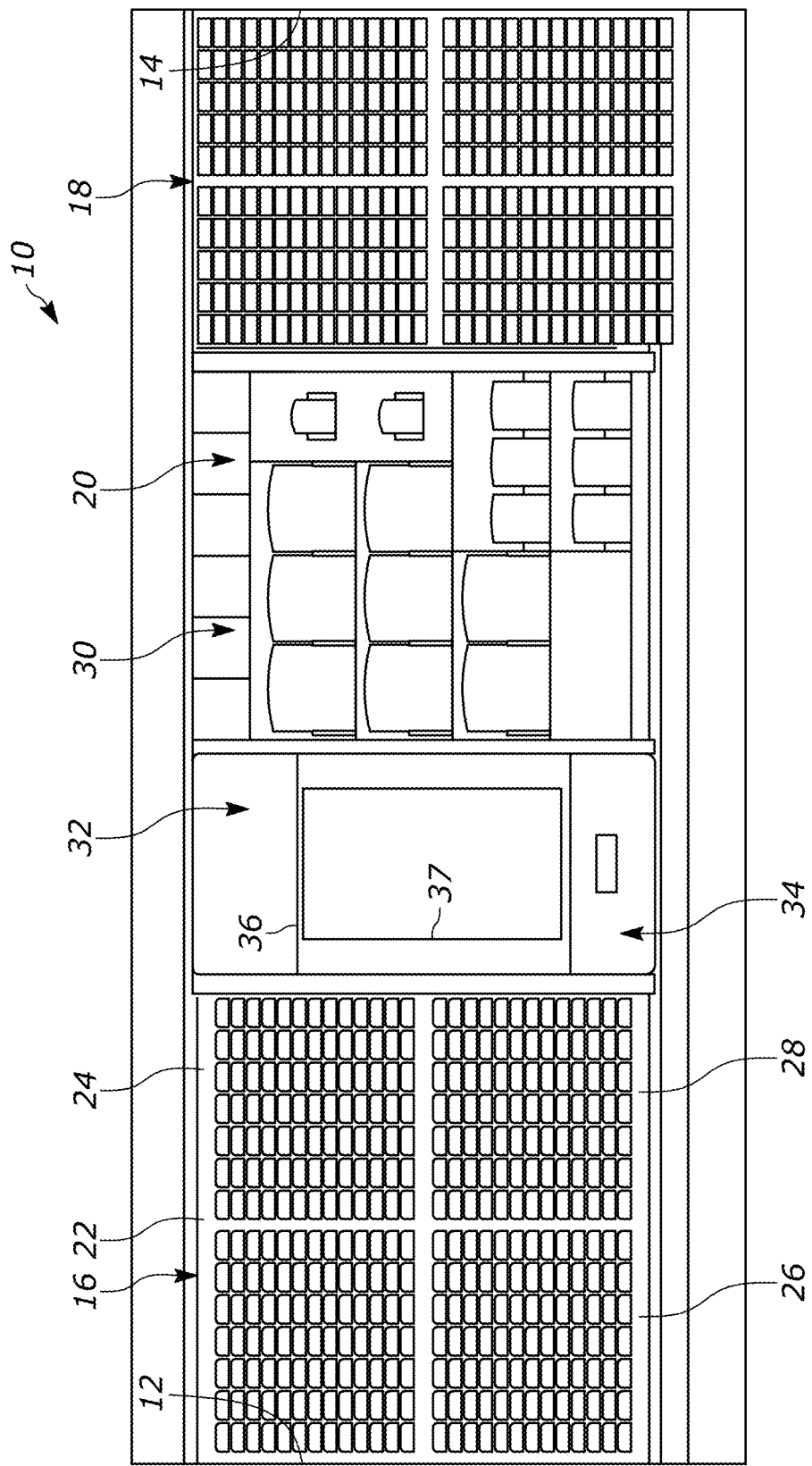
FIG. 1 is a front view of a display assembly according to the present disclosure.
Figure 2:
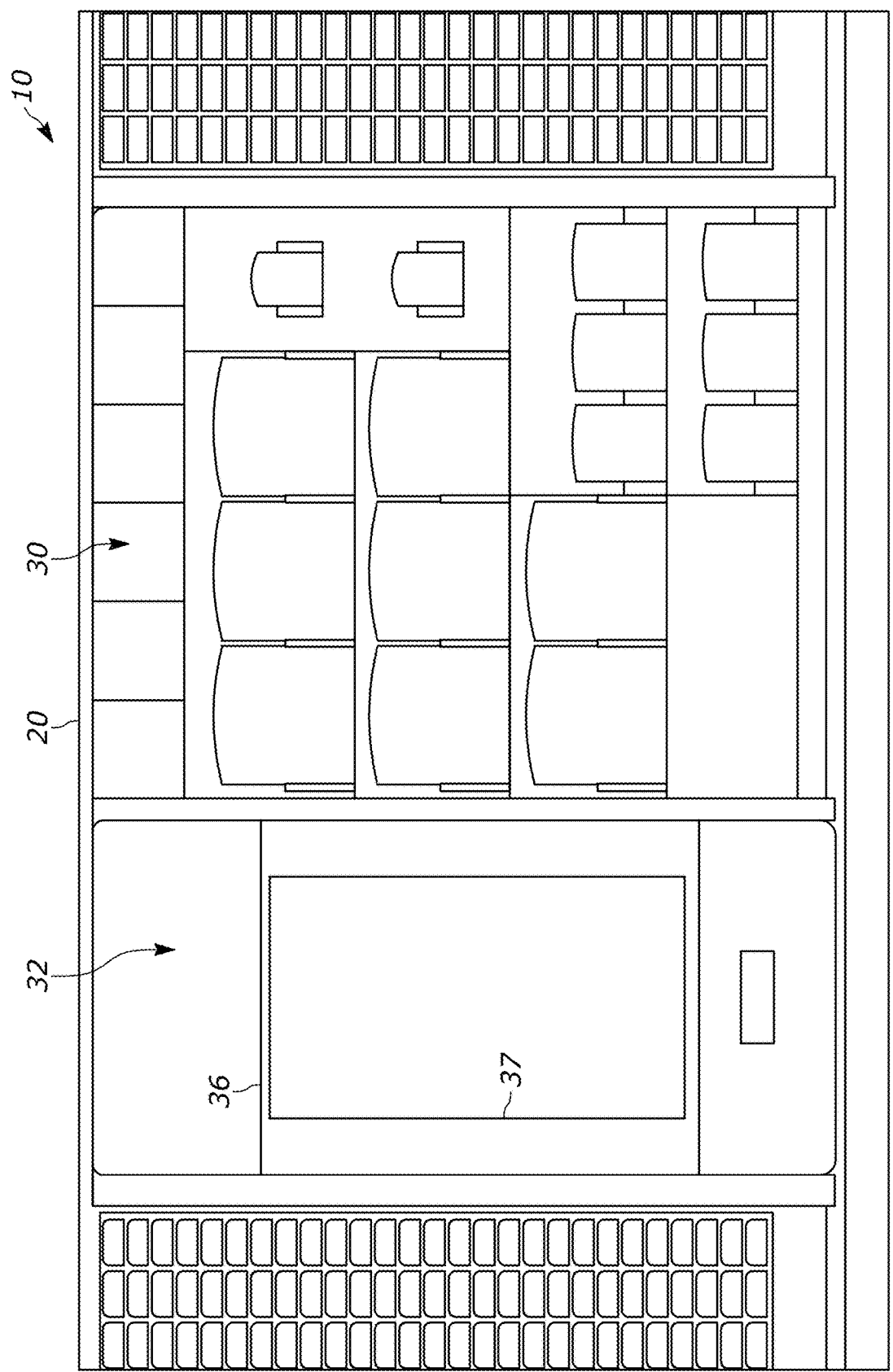
FIG. 2 is a front view of a portion of the display assembly shown in FIG. 1.
Figure 3:
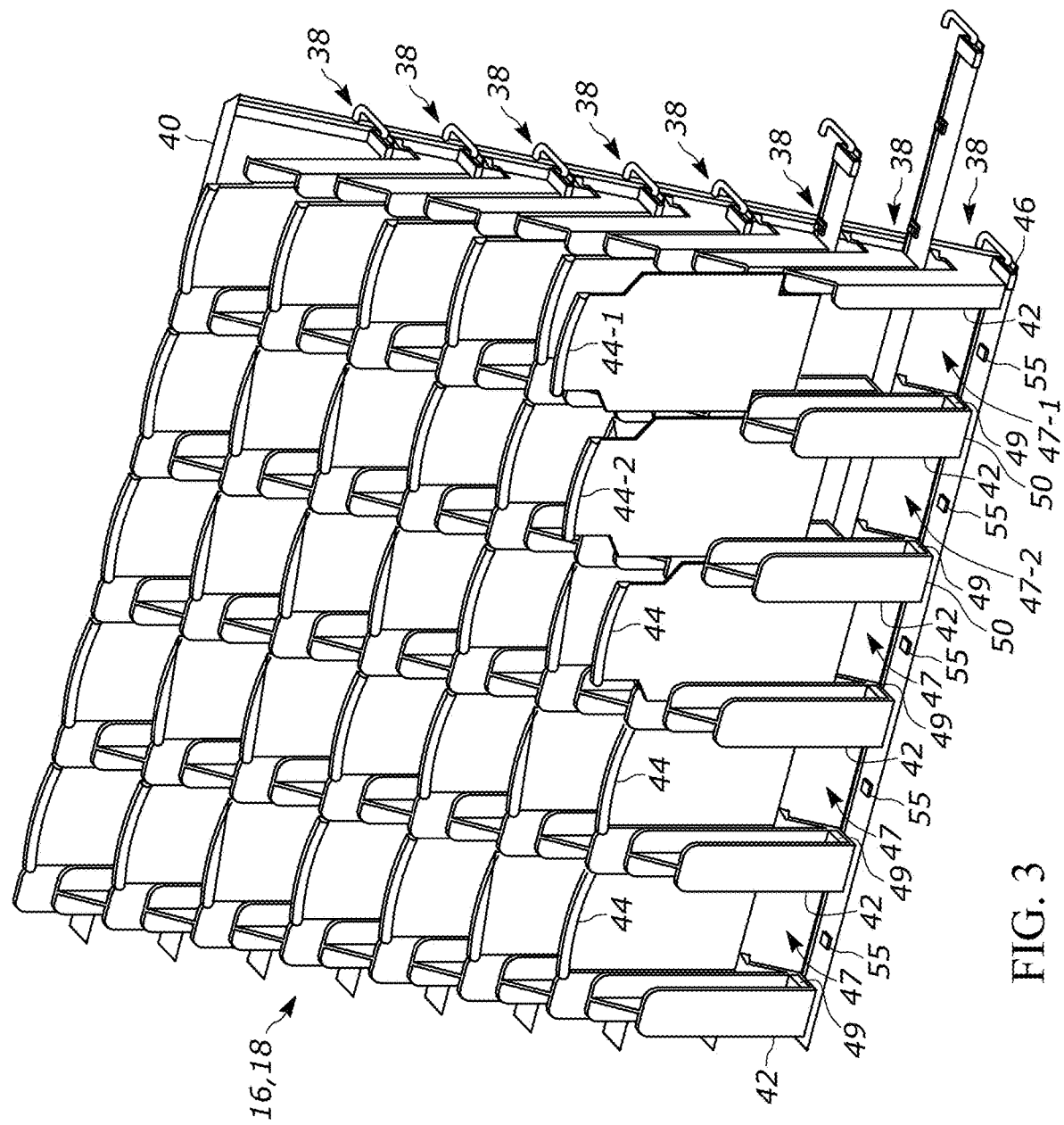
FIG. 3 is a perspective view of a paint chip section of the display assembly shown in FIG. 1.
Figure 4:
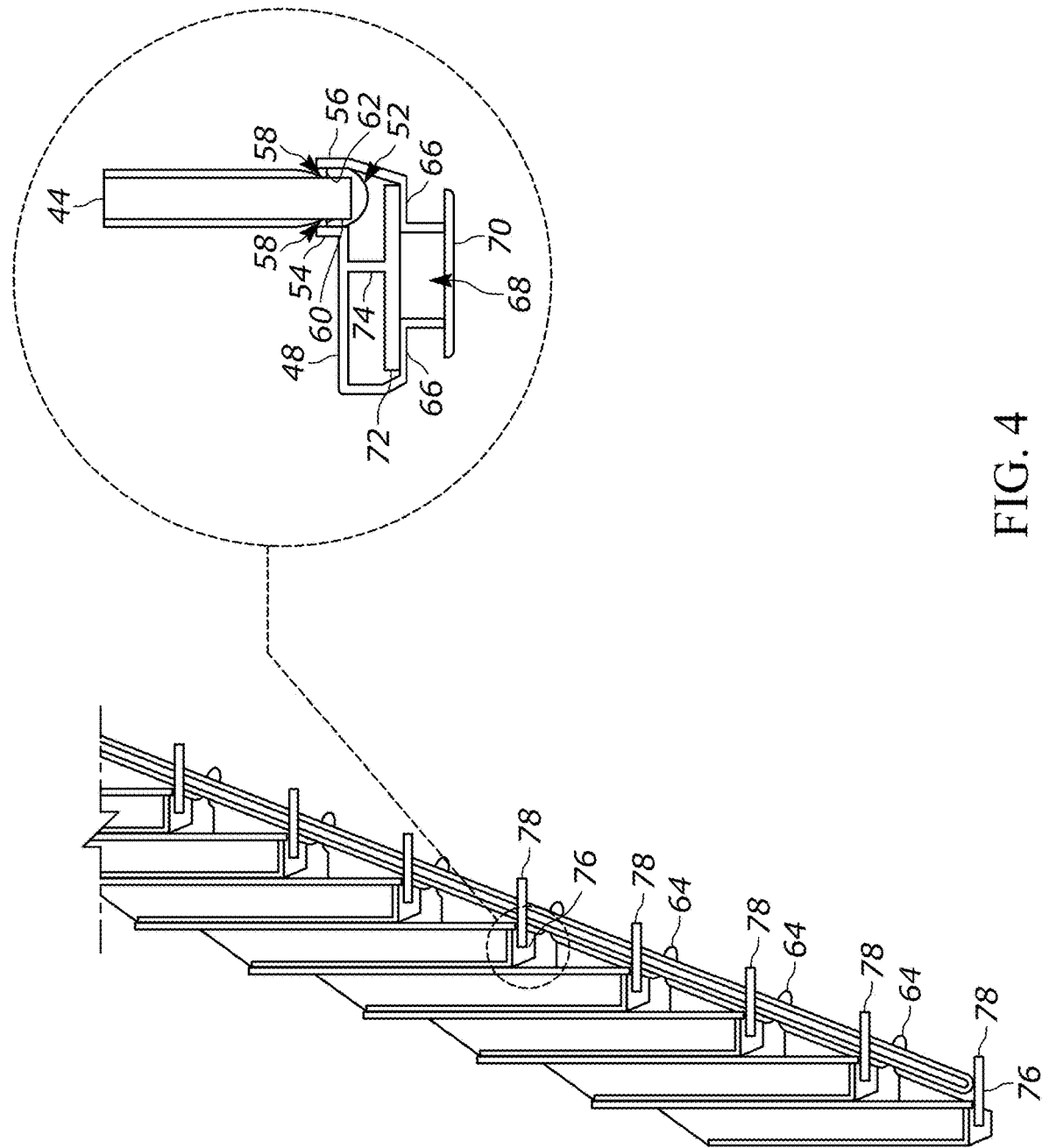
FIG. 4 is a close-up view of a portion of the paint chip section.
Figure 5:
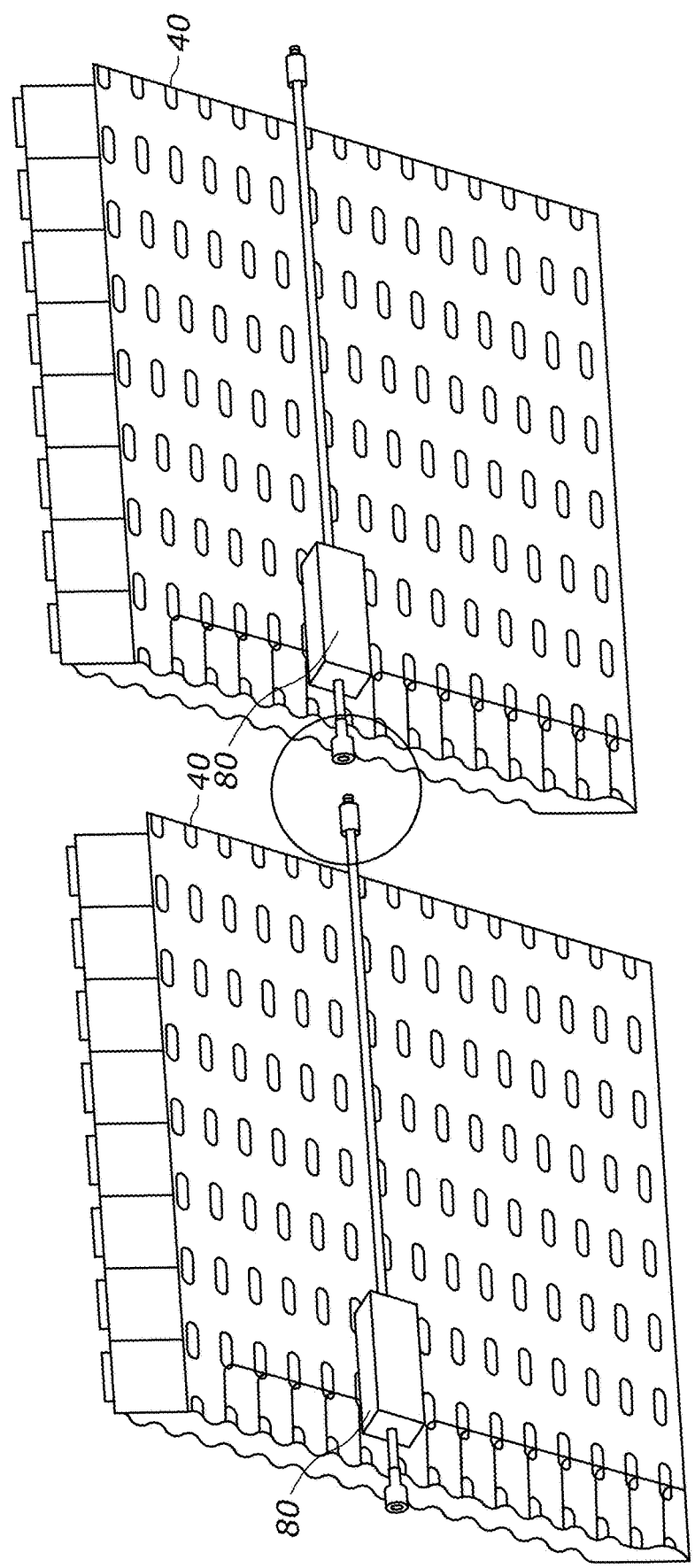
FIG. 5 is a back view of paint chip sections of the display assembly.
Figure 6:
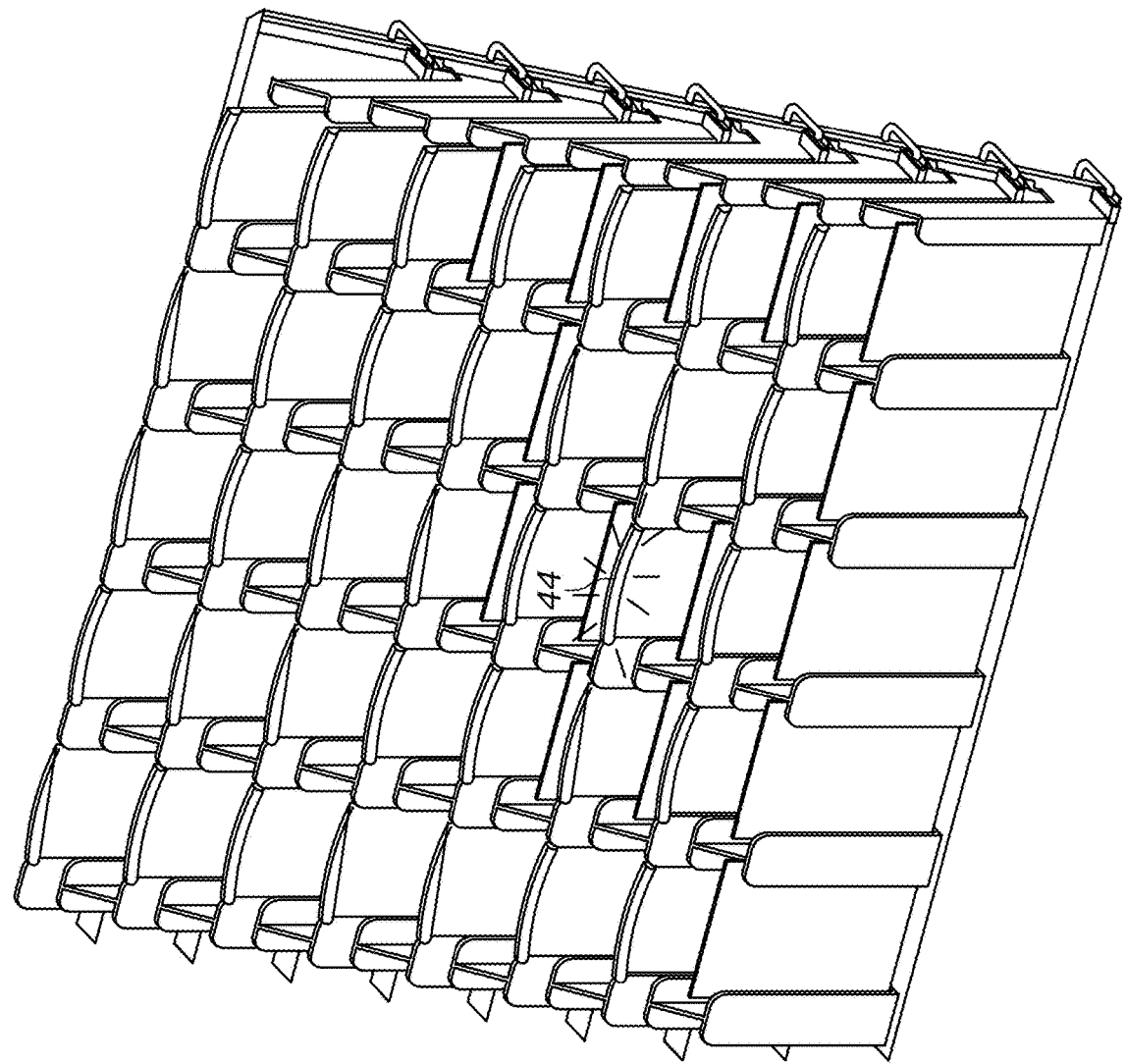
FIG. 6 is a perspective view of the paint chip section of the display assembly showing one divider tab illuminated.

With reference to FIGS. 1 and 2, an example illustration of a display assembly 10 is shown. The display assembly 10 includes a pair of side panels 12, 14. As an example, the pair of side panels 12, 14 may have a rectangular geometry or any other suitable geometry that may be utilized in a retail or other similar environment.

The display assembly 10 may also include paint color chip sections 16, 18 and a central section 20. In one embodiment, the paint color chip sections 16, 18 display a plurality of paint color chips. Furthermore, the plurality of paint color chips may be arranged in a manner that enables a user to readily identify and locate particular paint color chips. As an example, paint color chip section 16 may include subsections 22, 24, 26, 28, and each of the subsections may be associated with a particular hue, tint, shade, intensity/saturation, luminosity, etc. (e.g., subsection 22 may correspond to purple paint color chips, and the paint color chips are arranged in a vertically descending/ascending order from a lightest shade to a darkest shade of purple).

In one embodiment, the central section 20 includes an informational section 30 and a kiosk section 32. The informational section 30 provides a structure for hosting brochures, pamphlets, paint color chips, or other similar types of graphical presentation elements that may assist a user in selecting a paint color chip. As an example, the graphical presentation elements may include information corresponding to popular paint colors, seasonal paint colors, and other types of similar information.

The kiosk section 32 may include a kiosk 34 and a kiosk protective cover 36. In one embodiment, the kiosk 34 includes a display 37 (e.g., a capacitive touchscreen display) that is configured to provide graphical user interface (GUI) elements in order to enable a user to, for example, interact with the kiosk 34 by touching the display 37. Additionally or alternatively, the kiosk 34 may include a plurality of user interface (UI) elements, such as buttons, a keyboard, a mouse, etc., that enable the user to interact with the kiosk 34. Using one of the GUI and the UI elements, a user may generate an input corresponding to a selection of a particular paint color chip. In response to receiving an input corresponding to a selection of the paint color chip, the kiosk 34 is configured to determine a location of the paint color chip within the display assembly 10 and indicate the location of the paint color chip within the display assembly 10 to the user.

While this embodiment describes the central section 20 including the kiosk 34, it is understood that the central section 20 may include or may communicate with additional or alternative computing devices to perform the functions described herein, such as a PC, a laptop, a tablet device, a smartphone, and other similar computing devices.

With reference to FIGS. 3-6, detailed illustrations of the paint color chip sections 16, 18 are shown. The paint color chip sections 16, 18 may each include a plurality of shelving units 38 that are coupled to a respective display panel 40 of the paint color chip sections 16, 18. Each of the shelving units 38 may include a plurality of retaining panels 42, a plurality of divider tabs 44, and a shelving mechanism 46.

The retaining panels 42 are configured to define pockets 47 that structurally support and retain a plurality of paint color chips disposed in the pockets 47. As an example, a first set or two of the retaining panels 42 define a pocket 47-1 and are configured to structurally support and retain a plurality of paint color chips having a first color that are disposed in the pocket 47-1, a second set or two of the retaining panels 42 define a pocket 47-2 and are configured to structurally support and retain a plurality of paint color chips having a second color that are disposed in the pocket 47-2, and so on. Each set of retaining panels 42 is disposed on and physically coupled to a panel surface 48 of the shelving mechanism 46. As an example, each set of retaining panels 42 may be physically coupled to the panel surface 48 using an adhesive material (e.g., a glue), a fastening material (e.g., a screw and/or clip), and/or other coupling methods (e.g., snapping the retaining panels 42 into a pair of slots of the panel surface 48).

A plurality of sensors 49 may be associated with each shelving unit 38. That is, each sensor 49 may be disposed on a bottom surface 50 of one of the set of retaining panels 42 defining a respective pocket 47 and may be configured to measure a parameter indicative of a weight (or mass) of the respective pocket 47. For example, the sensor 49 may be disposed on the bottom surface 50 of one of the second set of retaining panels 42 and may be configured to measure the parameter indicative of the weight of the pocket 47-2 having paint color chips. The parameter may be a force or pressure, for example, that the paint color chips disposed in the pocket 47-2 exert on the sensor 49. As an example, a pocket 47 having no paint color chips disposed therein will have a weight of zero. In another example, a pocket 47 having five paint color chips disposed therein will have a greater weight than a pocket having three paint color chips disposed therein. The sensor 49 may be in communication with a paint color chip information module 53 of the kiosk 34 and may communicate this data to the paint color chip information module 53.

Additionally or alternatively, a plurality of optical devices 55 may be disposed on and attached to the panel surface 48 of each shelving mechanism 46 such that each optical device 55 is associated with a respective pocket 47. Each optical device 55 may include a light beam that is configured to scan the respective pocket 47 and obtain a parameter that is indicative of a thickness of the paint color chips disposed in the respective pocket 47. The plurality of optical devices 55 may be in communication with the paint color chip information module 53 of the kiosk 34 and may communicate this data to the paint color chip information module 53. For example, the light beam may scan each paint color chip in the respective pocket 47. Each thickness of paint color chips in the respective pocket 47 may be added to obtain the total thickness of the paint color chips disposed in the respective pocket 47. As an example, a pocket 47 having five paint color chips will have a greater total thickness than a pocket 47 having two paint color chips disposed therein. In another example, a pocket 47 having no paint color chips disposed therein will have a total thickness of zero. In some configurations, the light beam of the optical devices 55 may also obtain the color of the paint color chips in the respective pocket 47 and communicate this data to the paint color chip information module 53. While the example embodiment of FIG. 3 includes both sensors 49 and optical devices 55 for purposes of illustration, it is understood that embodiments of the present teachings may include pockets 47 that have only a sensor 49 or only an optical device 55. It is further understood that embodiments of the present teachings may include some pockets 47 that have only a sensor 49 and some pockets 47 that have only an optical device 55.

Each of the divider tabs 44 is associated with a respective color of the paint color chip. As an example, a first divider tab 44-1 is associated with a plurality of paint color chips having a first color, a second divider tab 44-2 is associated with a plurality of paint color chips having a second color, and so on. Each divider tab 44 is disposed within a tab channel 52 of the shelving mechanism 46, which is defined by at least a first tab surface 54 and a second tab surface 56. Specifically, the divider tab 44 may include a pair of slots 58 that are configured to snap into engagement with a first locking tab 60 of the first tab surface 54 and a second locking tab 62 of the second tab surface 56. Accordingly, a user may easily insert the divider tab 44 into the shelving mechanism 46 and simultaneously be unable to inadvertently remove the divider tab 44 when, for example, attempting to remove a paint color chip.

The shelving mechanism 46 may extend along the width of the respective shelving unit 38. Additionally, each of the shelving mechanisms 46 may be physically coupled to the display panel 40 via a plurality of fastening devices 64. As an example, the plurality of fastening devices 64 may be implemented by multiple cascaded rod structures that are joined at respective curved portions of the rod structures, and the plurality of fastening devices 64 may be partially disposed within multiple apertures of the display panel 40. In other embodiments, the fastening devices 64 may be implemented by clips, screws, or other similar fastening mechanism.

The shelving mechanism 46 may include a pair of supports 66 disposed between an opening 68 defined by the panel surface 48 and a bottom surface 70. Furthermore, a first light-emitting diode (LED) array 72 of a plurality of LED arrays 72 may be slidably disposed within the opening 68 and supported by the pair of supports 66. With the present disclosure describes the use of LED arrays for illuminating paint color chip locations within a display assembly, other light sources, such as other light sources utilizing light guides, may be used. A stop portion 74 of the shelving mechanism 46 prevents the LED array 72 from moving an upward direction within the opening 68.

Each of the shelving units 38 may include a respective cover 76 that conceals the opening 68 of the respective shelving mechanism 46. In one embodiment, the cover 76 may snap into engagement with the opening 68 of the shelving mechanism 46. Additionally, each of the LED arrays 72 may include a handle 78 that enables a user to easily insert the LED array 72 into the respective opening 68 of the shelving mechanism 46. Likewise, the handle 78 enables a user to easily remove the LED array 72 from the respective opening 68 of the shelving mechanism 46.

Each of the LED arrays 72 may be electrically coupled to each other via one or more connector devices 80, which enable the LED arrays 72 to be connected in parallel to a power source (not shown) and an LED control module (not shown). Furthermore, in response to receiving a signal from the LED control module, at least one of the LEDs of the plurality of LED arrays 72 are activated and emit light. The emitted light may contact an associated divider tab 44, which is configured to illuminate in response to receiving the emitted light, as illustrated by the dashed lines in FIG. 6.

Figure 7:
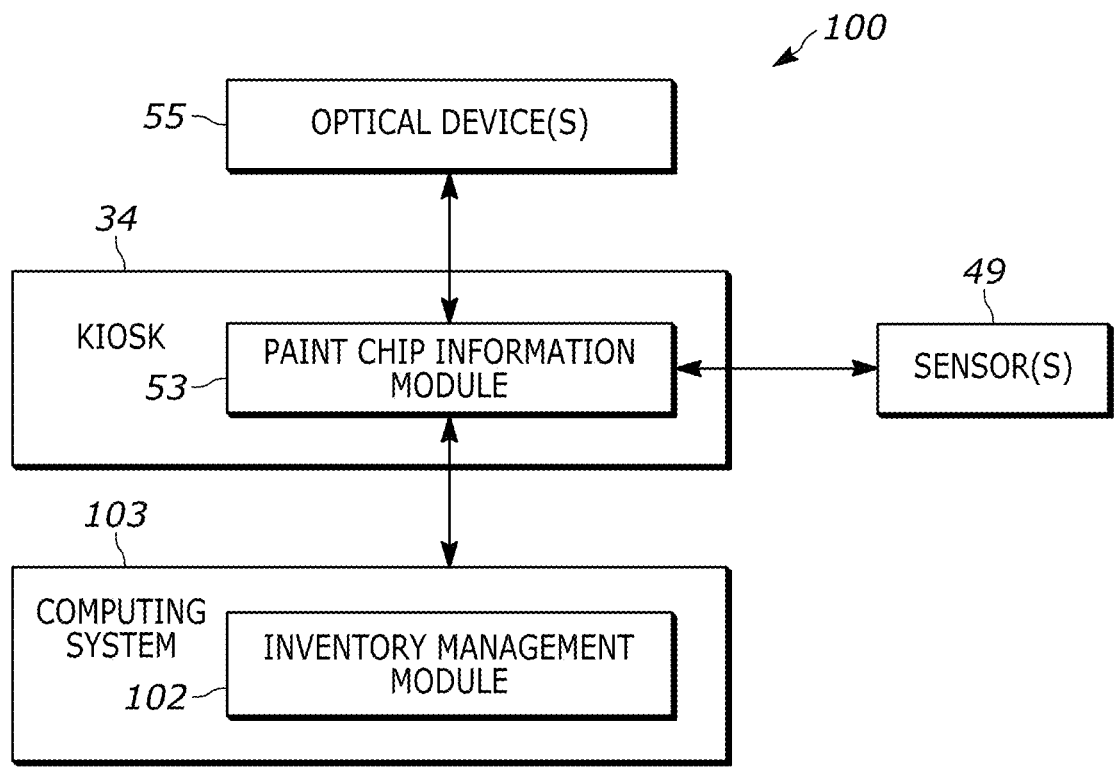
FIG. 7 is a functional block diagram of an example system according to the present disclosure.

With reference to FIG. 7, a functional block diagram of an example system 100 is shown. In one embodiment, the system 100 includes the kiosk 34, the sensors 49 and the optical devices 55. While the example embodiment of FIG. 7 includes both the sensors 49 and the optical devices 55 for purposes of illustration, it is understood that embodiments of the present teachings may include only sensors 49 or only optical devices 55.

The kiosk 34 includes the paint color chip informational module 53. The paint color chip informational module 53 may be implemented by instructions that are stored in a nontransitory computer-readable medium, such as a random-access memory (RAM) and/or read-only memory (ROM), and that are executable by a processor. The paint color chip informational module 53 may be in communication with the sensors 49 and the optical devices 55. That is, the paint color chip informational module 53 may receive data from the sensors 49 that includes a parameter indicative of the weight of each pocket 47. Similarly, the paint color chip informational module 53 may receive data from the optical devices 55 that includes a parameter indicative of the thickness of the paint color chips in each pocket 47.

The paint color chip informational module 53 may communicate with an inventory management module 102 of a central computing system 103 (e.g., a server computer) each pocket 47 that was identified as having a weight that is below the predetermined value and/or each pocket 47 having paint color chips having a total thickness below the predetermined value. Upon receiving this information, the inventory management module 102 may order paint color chips for each pocket 47 identified by the paint color chip informational module 53. The inventory management module 102 may be implemented by instructions that are stored in a nontransitory computer-readable medium, such as a random-access memory (RAM) and/or read-only memory (ROM), and that are executable by a processor of the computing system 103. The inventory management module 102 may order the paint color chips for each pocket 47 in real time or as a batch order (i.e., order the paint color chips for each pocket 47 all at one time). The paint color chip informational module 53 may include an application programming interface (API) that enables the inventory management module 102 to interpret the signal identifying the pockets 47 identified by the paint color chip informational module 53. The paint color chip informational module 53 may transmit the signal to the inventory management module 102 using a hardwire link (e.g., a twisted pair cable) or any suitable telemetric link such as a Bluetooth link, a Wi-Fi or Wi-Fi direct link, a cellular link, etc.

Figure 8:
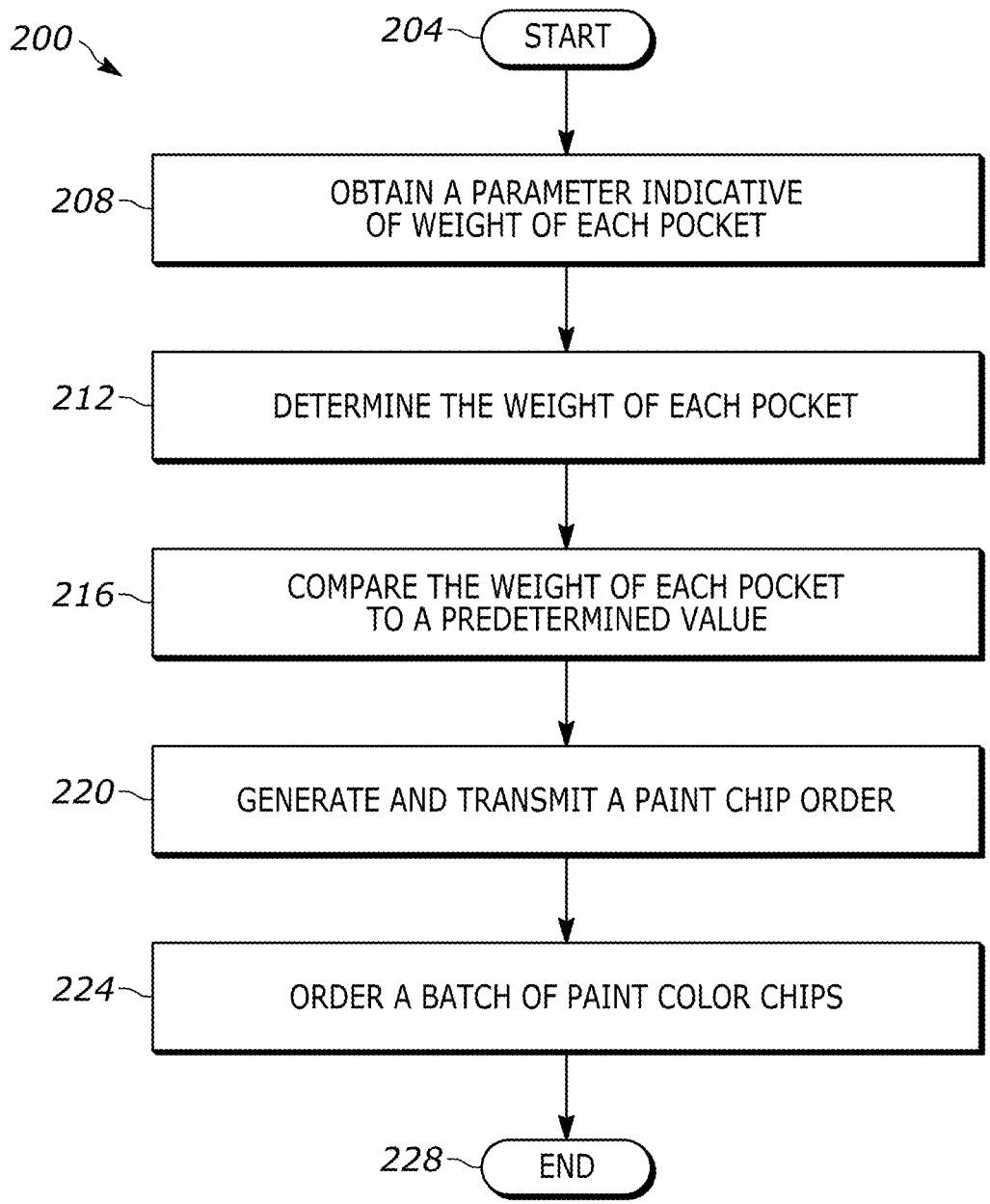
FIG. 8 is a flowchart illustrating an example control algorithm according to the present disclosure.

With reference to FIG. 8, a flowchart illustrating an example control algorithm 200 is shown. The control algorithm 200 starts at 204 when, for example, a predetermined time period elapses (e.g., 1 week). At 208, the control algorithm 200 obtains, using the paint color chip informational module 53, a parameter indicative of the weight of each pocket 47 from the sensors 49. The parameter indicative of the weight of each pocket 47 may be measured by sensors 49 disposed on a bottom surface 50 of each pocket 47. At 212, the control algorithm 200 determines, using the paint color chip informational module 53, the weight of each pocket 47 from the parameter indicative of the weight of each pocket 47.

At 216, the control algorithm 200 compares, using the paint color chip informational module 53, the weight of each pocket 47 to a predetermined value. At 220, the control algorithm 200 generates and transmits, using the paint color chip informational module 53, a paint chip order. The paint chip order includes requests from each pocket 47 having a weight being below the predetermined value. The paint chip order is transmitted to the computing system 103. At 224, the control algorithm 200 orders, using the inventory management module 102, a batch of paint color chips associated with the pockets 47 in the paint chip order. For example, the inventory management module 102 may order a first color of paint chips that correspond to one of the pockets 47 and a second color of paint chips that correspond to another one of the pockets 47. The control algorithm 200 then ends at 228.

Figure 9:
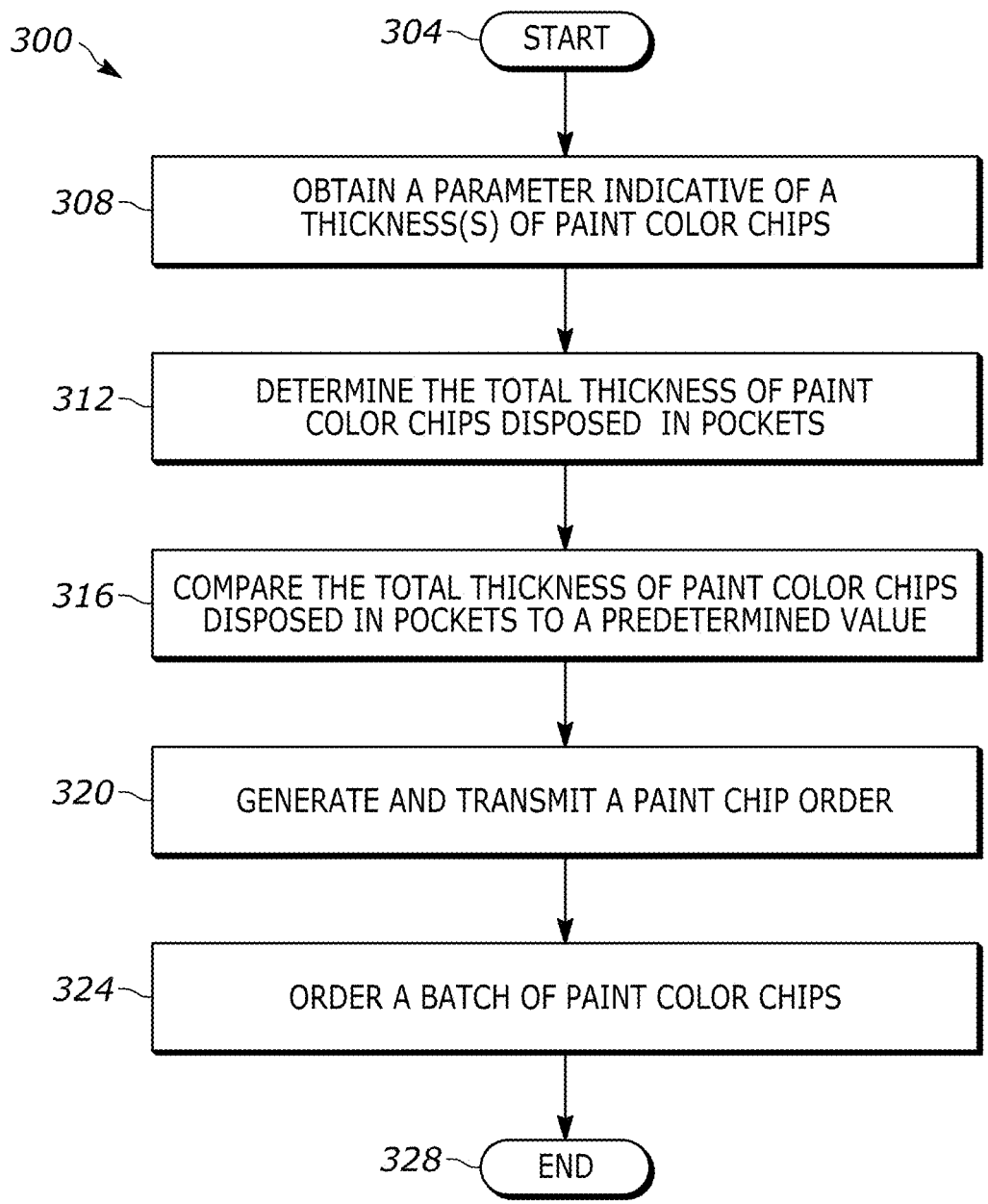
FIG. 9 is a flowchart illustrating another example control algorithm according to the present disclosure.

With reference to FIG. 9, a flowchart illustrating another example control algorithm 300 is shown. The control algorithm 300 starts at 304 when, for example, a predetermined time period elapses (e.g., 1 week). At 308, the control algorithm 300 obtains, using the paint color chip informational module 53, a parameter indicative of a thickness of the paint color chips disposed in respective pockets 47 of the shelving units 38. For example, a plurality of optical devices 55 may be disposed on and attached to the panel surface 48 of each shelving mechanism 46 such that each optical device 55 is associated with a respective pocket 47. Each optical device 55 may include a light beam that is configured to scan the respective pocket 47 and obtain the parameter indicative of thickness of the paint color chips disposed in the respective pocket 47. At 312, the control algorithm 300 determines, using the paint color chip informational module 53, the total thickness of the paint color chips disposed in the respective pockets 47.

At 316, the control algorithm 300 compares, using the paint color chip informational module 53, the total thickness of the paint color chips disposed in the respective pockets 47 to a predetermined value. At 320, the control algorithm 300 generates and transmits, using the paint color chip informational module 53, a paint chip order. The paint chip order includes requests from each pocket 47 having paint color chips having a total thickness below the predetermined value. The paint chip order is transmitted to the computing system 103. At 324, the control algorithm 300 orders, using the inventory management module 102, a batch of paint color chips associated with the pockets 47 in the paint chip order. For example, the inventory management module 102 may order a first color of paint chips that correspond to one of the pockets 47 and a second color of paint chips that correspond to another one of the pockets 47. The control algorithm 300 then ends at 328.

It should be understood that if one or more corresponding pockets 47 are not below the predetermined value after a period of time (e.g., 3 weeks), the paint color chip informational module 53 may communicate with the inventory management module 102 so that the inventory management module 102 orders paint color chips for the one or more corresponding pockets 47.

One of the benefits of the present disclosure is that the number of paint color chips within each pocket 47 of the shelving units 38 may be determined without manual labor (i.e., an employee of the retail store counting the number of each paint color chips within each pocket 47 of the shelving units 38). Another benefit of the present disclosure is that the kiosk 34 may automatically send a signal causing the ordering of paint color chips for each pocket 47 identified as being below the predetermined value without the need of human input.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a shelving unit having a plurality of adjacent pairs of retaining panels arranged along and coupled to a shelving mechanism with each adjacent pair of retaining panels defining a pocket configured to receive a plurality of paint color chips;
a plurality of sensors, each sensor of the plurality of sensors being mounted on a retaining panel of one of the plurality of adjacent pairs of retaining panels such that each pocket has a corresponding sensor from the plurality of sensors, the sensor being configured to obtain a parameter indicative of a weight of any paint color chips located within the corresponding pocket; and
a processor configured to execute instructions stored in a nontransitory computer-readable medium, wherein the instructions include:
obtaining, from each sensor of the plurality of sensors, the parameter indicative of the weight of any paint color chips located within the corresponding pocket for each sensor;
determining the weight of any paint color chips located within each pocket corresponding to each sensor based on the parameter received from each sensor;
comparing the weight of any paint color chips located within each pocket with a predetermined value;
generating a paint chip order for additional paint color chips corresponding to any pocket for which the weight is below the predetermined value; and
transmitting the paint chip order to a computing system.

2. The system of claim 1, wherein transmitting the paint chip order to the computing system causes the computing system to order the additional paint color chips.

3. A method comprising:
 obtaining, from each sensor of a plurality of sensors, a parameter indicative of a weight of any paint color chips located within a corresponding pocket of a plurality of pockets, each pocket of the plurality of pockets being configured to receive a plurality of paint color chips and being defined by an adjacent pair of retaining panels from a plurality of adjacent pairs of retaining panels arranged along and coupled to a shelving mechanism of a shelving unit, each sensor of the plurality of sensors being mounted on a retaining panel of one of the plurality of adjacent pairs of retaining panels such that each pocket of the plurality of pockets has a corresponding sensor from the plurality of sensors;
 determining, using a processor, the weight of any paint color chips located within each pocket corresponding to each sensor based on the parameter received from each sensor;
 comparing, using the processor, the weight of any paint color chips located within each pocket with a predetermined value;
 generating, using the processor, a paint chip order for additional paint color chips corresponding to any pocket for which the weight is below the predetermined value; and
 transmitting, using the processor, the paint chip order to a computing system.

4. The method of claim 3, wherein transmitting the paint chip order to the computing system causes the computing system to order the additional paint color chips.

5. A system comprising:
 a shelving unit including a plurality of pockets, each pocket configured to hold associated paint chips and being defined by an adjacent pair of retaining panels from a plurality of adjacent pairs of retaining panels arranged along and coupled to a shelving mechanism of the shelving unit;
 a plurality of weight sensors, each weight sensor being installed in a corresponding pocket of the plurality of pockets, mounted on a retaining panel of the adjacent pair of retaining panels that define the corresponding pocket, and configured to determine a weight of any associated paint chips held in the corresponding pocket;
 a processor configured to execute instructions stored in a nontransitory computer-readable medium, the instructions including:
  receiving the weight sensed by each of the plurality of weight sensors;
  comparing the weight sensed by each of the plurality of weight sensors with a predetermined weight threshold;
  generating a paint chip order in response to a weight from a particular weight sensor of the plurality of weight sensors being less than the predetermined weight threshold, the paint chip order indicating the associated paint chips for the corresponding pocket within which the particular weight sensor is installed; and
  transmitting the paint chip order to a computing system.

6. The system of claim 5, wherein transmitting the paint chip order to the computing system causes the computing system to generate an order for the associated paint chips.

* * * * *